United States Patent
Yao et al.

(10) Patent No.: US 7,298,593 B2
(45) Date of Patent: Nov. 20, 2007

(54) MICRO-ACTUATOR INCLUDING A LEADING BEAM PIVOT PART, HEAD GIMBAL ASSEMBLY AND DISK DRIVE UNIT WITH THE SAME

(75) Inventors: MingGao Yao, DongGuan (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 420 days.

(21) Appl. No.: 10/954,229

(22) Filed: Oct. 1, 2004

(65) Prior Publication Data

US 2006/0072247 A1 Apr. 6, 2006

(51) Int. Cl.
*G11B 5/56* (2006.01)
*G11B 21/04* (2006.01)

(52) U.S. Cl. ............... 360/294.4; 360/294.2; 360/294.3; 360/294.5

(58) Field of Classification Search ............ 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,215,629 B1* | 4/2001 | Kant et al. | ............ 360/290 |
| 6,246,552 B1* | 6/2001 | Soeno et al. | ............ 360/294.4 |
| 6,320,730 B1* | 11/2001 | Stefansky et al. | ....... 360/294.4 |
| 6,396,667 B1* | 5/2002 | Zhang et al. | ........... 360/294.3 |
| 6,538,836 B1 | 3/2003 | Dunfield et al. | |
| 6,570,730 B1* | 5/2003 | Lewis et al. | ............ 360/75 |
| 6,590,748 B2* | 7/2003 | Murphy et al. | ........... 360/294.4 |
| 6,611,399 B1* | 8/2003 | Mei et al. | ............ 360/234.7 |
| 6,617,763 B2 | 9/2003 | Mita et al. | |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Angel Castro
*Assistant Examiner*—Christopher R. Magee
(74) *Attorney, Agent, or Firm*—Nixon & Vanderhye P.C.

(57) ABSTRACT

A HGA includes a slider, a micro-actuator horizontally rotating the slider with a central portion of the slider as a rotation center, and a suspension to load the slider and the micro-actuator; wherein the micro-actuator comprises a support frame having a base, a moving plate, and a leading beam to connect the base and the moving plate; and at least one piezoelectric pieces to be connected with the base and the moving plate; wherein the leading beam has a pivot part to assist the horizontal swing of the slider. The pivot part has a narrower width than that of the leading beam. The suspension also includes a support means to support the base of the support frame on a suspension tongue portion. The invention also discloses a disk drive unit having the HGA.

20 Claims, 8 Drawing Sheets

U.S. PATENT DOCUMENTS

| | | | |
|---|---|---|---|
| 6,621,661 B1 * | 9/2003 | Ichikawa et al. | 360/234.5 |
| 6,624,984 B2 | 9/2003 | Lewis et al. | |
| 6,661,617 B1 * | 12/2003 | Hipwell et al. | 360/294.4 |
| 6,671,131 B2 | 12/2003 | Kasajima et al. | |
| 6,700,727 B1 | 3/2004 | Crane et al. | |
| 6,700,746 B1 * | 3/2004 | Brandt et al. | 360/245.4 |
| 6,700,749 B2 | 3/2004 | Shiraishi et al. | |
| 6,728,077 B1 * | 4/2004 | Murphy | 360/294.4 |
| 6,738,231 B2 * | 5/2004 | Arya et al. | 360/294.4 |
| 6,879,469 B2 * | 4/2005 | Liu et al. | 360/294.4 |
| 6,927,945 B2 * | 8/2005 | Yao et al. | 360/294.3 |
| 6,930,860 B1 * | 8/2005 | Coffey | 360/294.4 |
| 6,950,266 B1 | 9/2005 | McCaslin et al. | |
| 6,961,221 B1 * | 11/2005 | Niu et al. | 360/294.4 |
| 7,099,115 B2 * | 8/2006 | Yao et al. | 360/244.7 |
| 2002/0097663 A1 * | 7/2002 | O'Neill | 369/222 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2003/0202290 A1 * | 10/2003 | Pan et al. | 360/294.4 |
| 2003/0231434 A1 * | 12/2003 | Mita et al. | 360/294.4 |
| 2004/0061969 A1 * | 4/2004 | Yang et al. | 360/78.05 |
| 2004/0120081 A1 * | 6/2004 | Kurihara et al. | 360/294.4 |
| 2006/0023338 A1 | 2/2006 | Sharma et al. | |
| 2006/0050442 A1 | 3/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |

FOREIGN PATENT DOCUMENTS

| | | | |
|---|---|---|---|
| JP | 2002133803 A * | 5/2002 | |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

(Prior Art)

MICRO-ACTUATOR INCLUDING A LEADING BEAM PIVOT PART, HEAD GIMBAL ASSEMBLY AND DISK DRIVE UNIT WITH THE SAME

FIELD OF THE INVENTION

The present invention relates to disk drive units, and particularly relates to a micro-actuator, and a head gimbal assembly using the micro-actuator.

BACKGROUND OF THE INVENTION

Figure 1A:
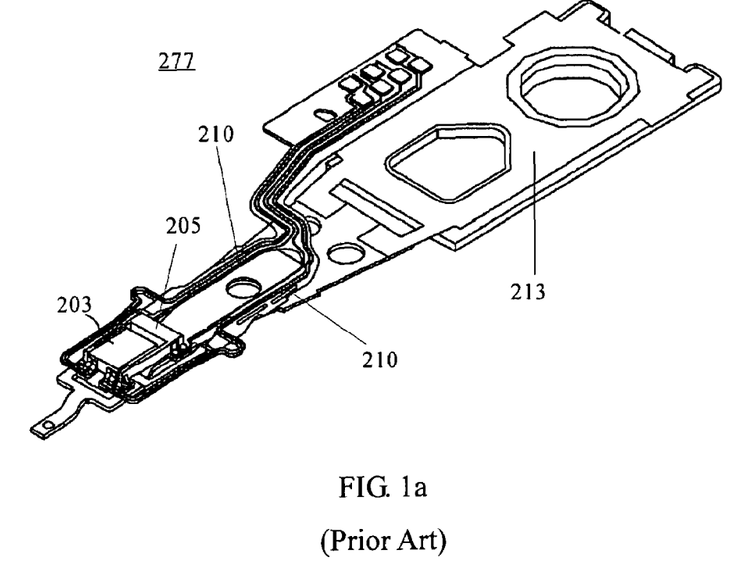
FIG. 1*a* is a perspective view of a HGA of related art.

Disk drives are information storage devices that use magnetic media to store data. Referring to FIG. 1a, a typical disk drive in related art has a magnetic disk and a drive arm to drive a head gimbal assembly 277 (HGA) (the HGA 277 has a suspension (not labeled) with a slider 203 mounted thereon). The disk is mounted on a spindle motor which causes the disk to spin and a voice-coil motor (VCM) is provided for controlling the motion of the drive arm and thus controlling the slider 203 to move from track to track across the surface of the disk to read data from or write data to the disk.

However, Because of the inherent tolerance resulting from VCM and the suspension that exists in the displacement (off track) of the slider 203, the slider 203 can not attain a fine position control which will affect the slider 203 to read data from and write data to the magnetic disk.

To solve the above-mentioned problem, piezoelectric (PZT) micro-actuators are now utilized to modify the displacement of the slider 203. That is, the PZT micro-actuator corrects the displacement of the slider 203 on a much smaller scale to compensate for the resonance tolerance of the VCM and the suspension. It enables a smaller recording track width, increases the 'tracks per inch' (TPI) value by 50% of the disk drive unit (it is equivalent to increase the surface recording density).

Figure 1B:
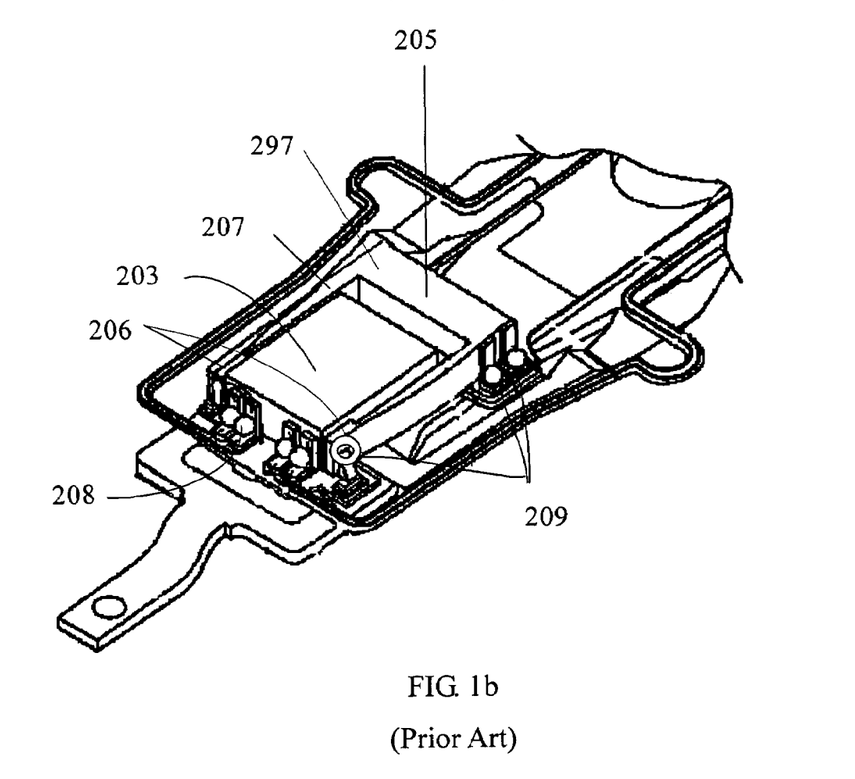
FIG. 1*b* is an enlarged, partial view of FIG. 1*a*.
Figure 1C:
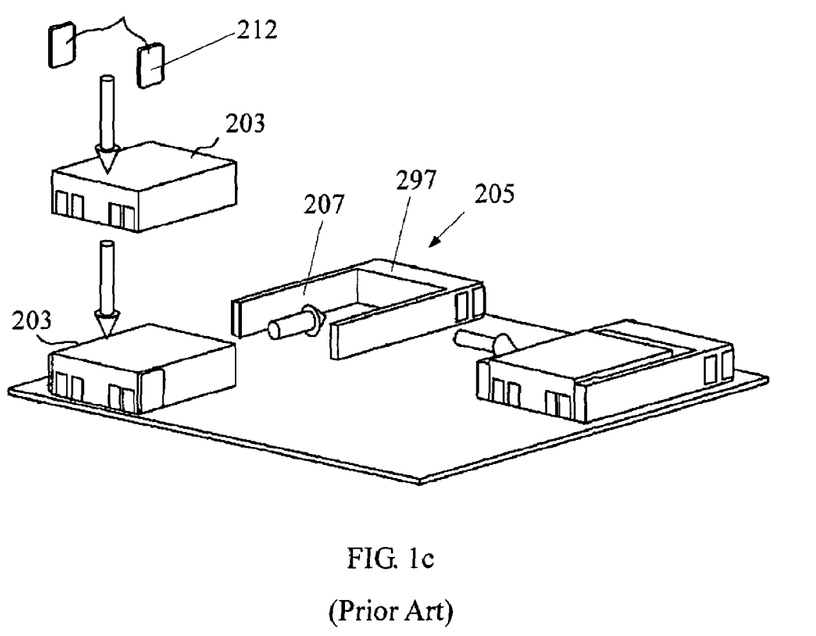
FIG. 1*c* shows a detailed process of inserting a slider to a micro-actuator of the HGA in FIG. 1*a*.

Referring to FIG. 1b, a traditional PZT micro-actuator 205 comprises a ceramic U-shaped frame 297 which comprises two ceramic beams 207 with two PZT pieces (not labeled) on each side thereof. With reference to FIGS. 1a and 1b, the PZT micro-actuator 205 is physically coupled to a suspension 213, and there are three electrical connection balls 209 (gold ball bonding or solder ball bonding, GBB or SBB) to couple the micro-actuator 205 to the suspension traces 210 in each one side of the ceramic beam 207. In addition, there are four metal balls 208 (GBB or SBB) to couple the slider 203 to the suspension 213 for electrical connection. FIG. 1c shows a detailed process of inserting the slider 203 into the micro-actuator 205. The slider 203 is bonded with the two ceramic beams 207 at two points 206 by epoxy dots 212 so as to make the motion of the slider 203 dependent of the ceramic beams 207 of the micro-actuator 205.

When power supply is applied through the suspension traces 210, the PZT pieces of the micro-actuator 205 will expand or contract to cause two ceramic beams 207 of the U-shaped frame 297 deform and then make the slider 203 move on the track of the disk. Thus a fine head position adjustment can be attained.

Figure 2:
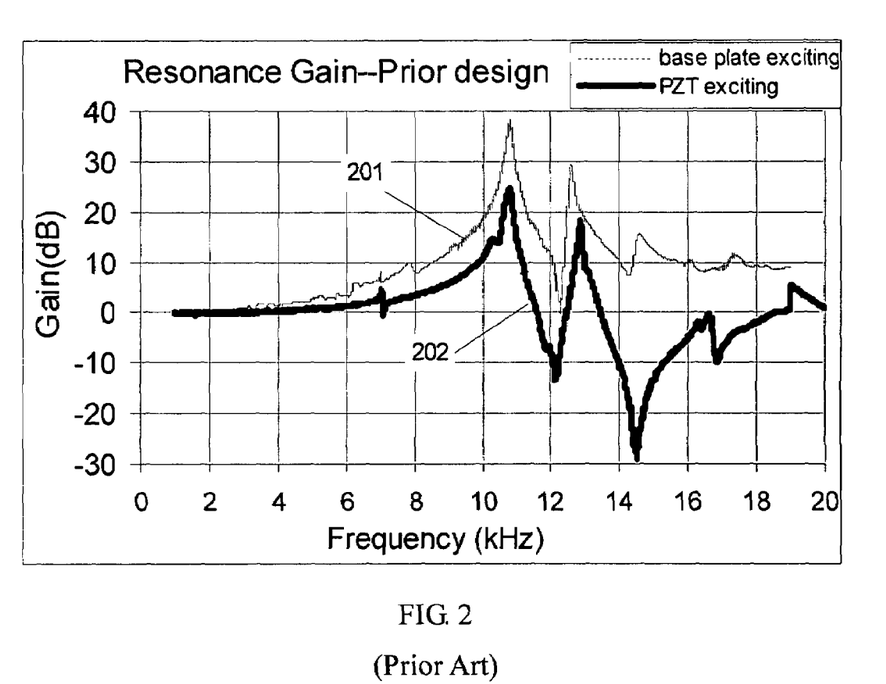
FIG. 2 shows a resonance curve of the HGA of FIG. 1*a*.

However, because the PZT micro-actuator 205 and the slider 203 are mounted on the suspension tongue (not labeled), when the PZT micro-actuator 205 is excited, it will do a pure translational motion to sway the slider 203 due to the constraint of U-shaped frame 297 of the micro-actuator 205, and cause a suspension vibration resonance which has a same frequency as the suspension base plate. This will limit the servo bandwidth and the capacity improvement of HDD. As shown in FIG. 2, numeral 201 represents a resonance curve when shaking the suspension base plate and numeral 202 represents a resonance curve when exciting the micro-actuator 205. The figure clearly shows the above-mentioned problem.

Additionally, the micro-actuator 205 has an additional mass which not only influence the static performance, but also influence the dynamic performance of the suspension 213, such as the resonance performance, so as to reduce resonance frequency and increase the gain of the suspension 213.

Also, because the U-shaped frame 297 of the micro-actuator 205 are very brittle so as to the shock performance is still one of the concern.

Hence, it is desired to provide a micro-actuator, HGA, disk drive to solve the above-mentioned problems.

SUMMARY OF THE INVENTION

A main feature of the present invention is to provide a micro-actuator and a HGA which can attain a fine head position adjustment and a good resonance performance when exciting the micro-actuator.

Another feature of the present invention is to provide a disk drive unit with big servo bandwidth and head position adjustment capacity.

To achieve the above-mentioned features, a HGA of the invention comprises a slider, a micro-actuator, and a suspension to load the slider and the micro-actuator. The micro-actuator horizontally rotates the slider with a central portion of the slider as a rotation center. In the present invention, the micro-actuator comprises a support frame having a base, a moving plate, and a leading beam to connect the base and the moving plate; and at least one PZT pieces to be connected with the base and the moving plate; wherein the leading beam has a pivot part to assist the horizontal swing of the slider. In the present invention, the pivot part has a narrower width than that of the leading beam. As an embodiment, the suspension comprises a support means to support the base of the support frame on a suspension tongue portion. The at least one PZT pieces are sandwiched between the suspension tongue portion and the support frame of the micro-actuator, and an ACF piece physically and electrically bonds the at least one piezoelectric pieces with the suspension.

As an embodiment, the slider is partially mounted on the moving plate of the support frame. The support means is integrally formed with the suspension or bonded to the suspension, which can be made of polymer or metal. In an embodiment, the suspension has a load beam with a dimple to support the suspension tongue and the pivot part is formed corresponding to the position of the dimple. A parallel gap is formed between the support frame and the suspension tongue. In the invention, the at least one PZT pieces are thin film piezoelectric pieces or ceramic PZT pieces, which a single-layer structure or a multi-layer structure comprising a substrate layer and a PZT layer. The PZT layer is a single-layer PZT structure or a multi-layer PZT structure, the substrate layer is made of metal, ceramic, or polymer.

In an embodiment of the invention, the base and the moving plate are connected in parallel by the leading beam on a predetermined distance, each of which has a rectangle shape. Each of the at least one piezoelectric pieces has two ends bonded with the base and the moving plate, which has a plurality of electrical bonding pads formed thereon.

A disk drive unit of the present invention comprises a HGA, a drive arm to connect with the HGA, a disk and a spindle motor to spin the disk. The HGA comprises a slider, a micro-actuator; and a suspension to load the slider and the micro-actuator; wherein the micro-actuator horizontally rotates the slider with a central portion of the slider as a rotational center, which comprises a support frame having a base, a moving plate, and a leading beam to connect the base and the moving plate; and at least one piezoelectric pieces to be connected with the base and the moving plate; wherein the leading beam has a pivot part to assist the horizontal swing of the slider.

Compared with the prior art, the micro-actuator utilizes PZT pieces to rotate the moving plate of the support frame and then rotate the slider because the slider is partially bonded with the moving plate. The leading beam with a pivot part prevents the slider from lateral movement, while permitting the slider rotate about the pivot part. Since the pivot part coincides with the center line of the slider, the slider can servo without exciting the HGA sway mode. That is, both trailing side and leading side of the slider can be rotated in different directions so as to make the slider get a bigger moving range. Since the slider is rotated around its center, accordingly, a big head position adjustment capacity and a widely servo bandwidth can be achieved. Generally, a micro-actuator that adjusts a slider by rotating method can be three times as efficient as one that adjust a slider by translation method (e.g. the prior design). The micro-actuator of this invention adjusts the slider by rotating method which is free of translation, so it will be three times as efficient as the prior design. In addition, this invention only need to provide a 10V drive voltage for PZT operation instead of 40V drive voltage for the prior design because of absence of sway mode of the micro-actuator, accordingly, it will save energy and perform a good resonance as well. In addition, because a support means is formed on the suspension tongue to support the base of the support frame so that a parallel gap is formed between the support frame and the suspension tongue, when the micro-actuator is excited, the moving plate will be rotated more freely and then cause the slider to rotate in a large range. Furthermore, a suspension resonance has not happened in a low frequency, but only a pure micro-actuator resonance happened in a high frequency, this would enlarge the servo bandwidth and then improve the capacity of the HDD. Finally, the structure of the micro-actuator will attain a good shock performance comparing with the U-shaped ceramic frame.

For the purpose of making the invention easier to understand, several particular embodiments thereof will now be described with reference to the appended drawings in which:

DETAILED DESCRIPTION OF THE INVENTION

Figure 3:
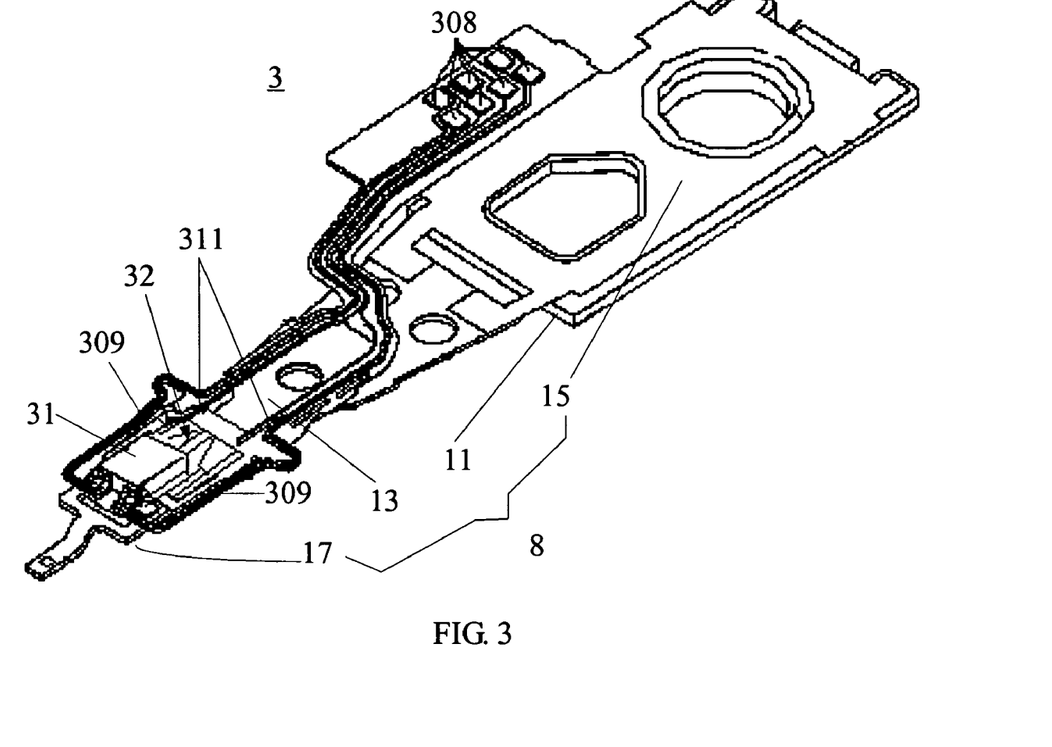
FIG. 3 is a perspective view of a HGA according to a first embodiment of the present invention.

Referring to FIG. 3, a head gimbal assembly (HGA) 3 of the present invention comprises a slider 31, a micro-actuator 32 and a suspension 8 to load the slider 31 and the micro-actuator unit 32.

Figure 4:
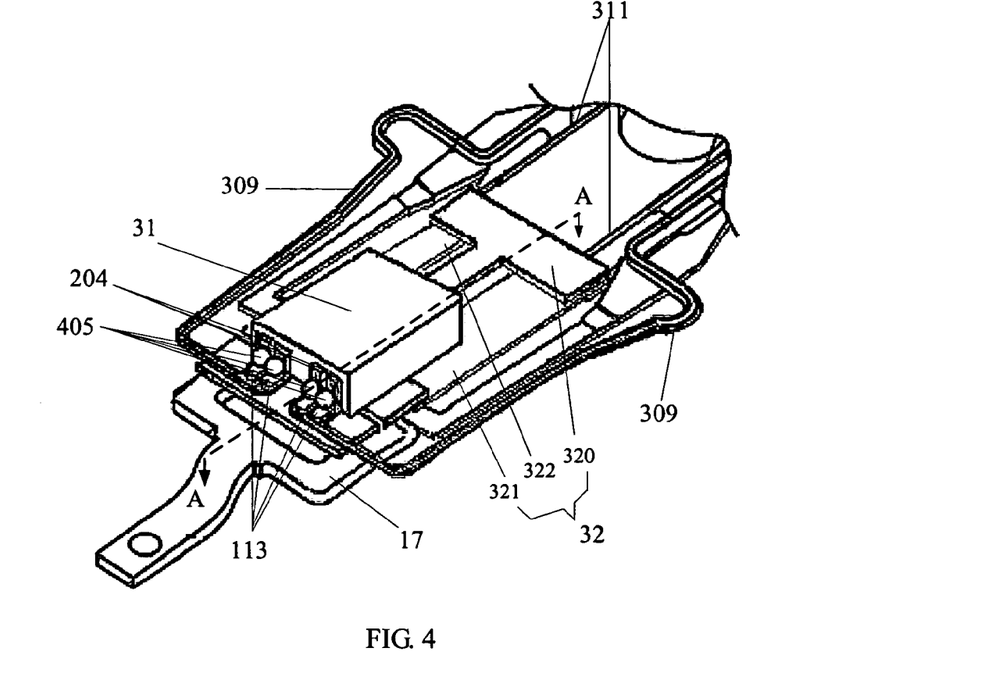
FIG. 4 is an enlarged, partial view of the HGA of FIG. 3.
Figure 5:
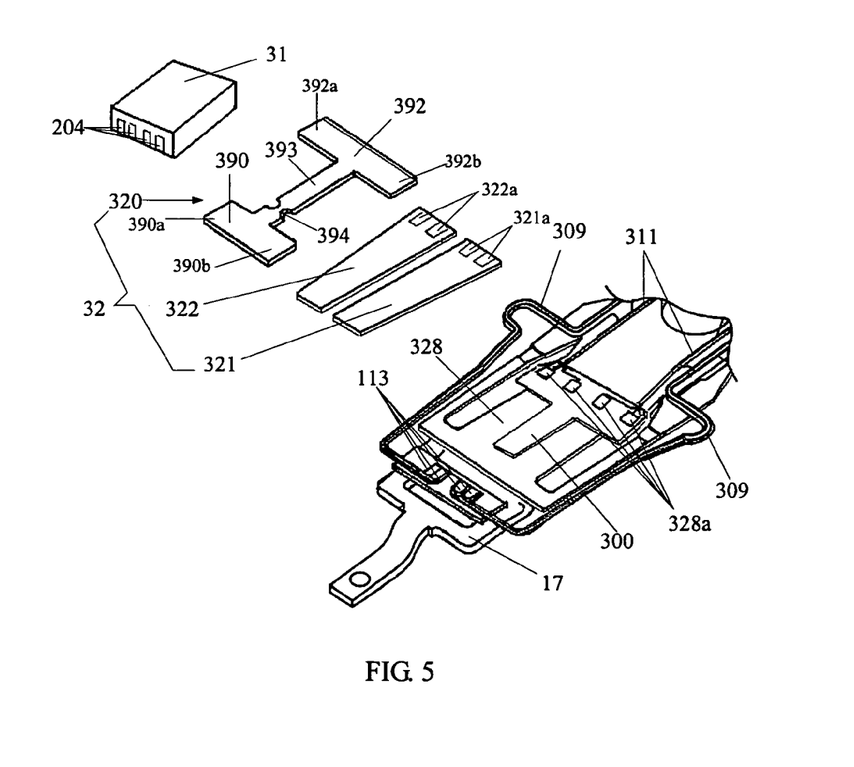
FIG. 5 is an exploded, perspective view of the HGA of FIG. 3.

Also referring to FIG. 3, the suspension 8 comprises a load beam 17, a flexure 13, a hinge 15 and a base plate 11. The load beam 17 has a dimple 329 (see FIG. 6) formed thereon. On the flexure 13 a plurality of connection pads 308 are provided to connect with a control system (not shown) at one end and a plurality of electrical multi-traces 309, 311 is provided in the other end. Referring to FIGS. 4 and 5, the flexure 13 also comprises a suspension tongue 328 which are used to support the micro-actuator 32 and the slider 31, and keep the loading force always being applied to the center area of the slider 31 through the dimples 329 of the load beam 17. The suspension tongue 328 has a plurality of electrical bonding pads 113 and 328*a* formed thereon. The slider 31 has a plurality of electrical bonding pads 204 on an end thereof corresponding to the electrical bonding pads 113 of the suspension tongue 328.

Figure 6:
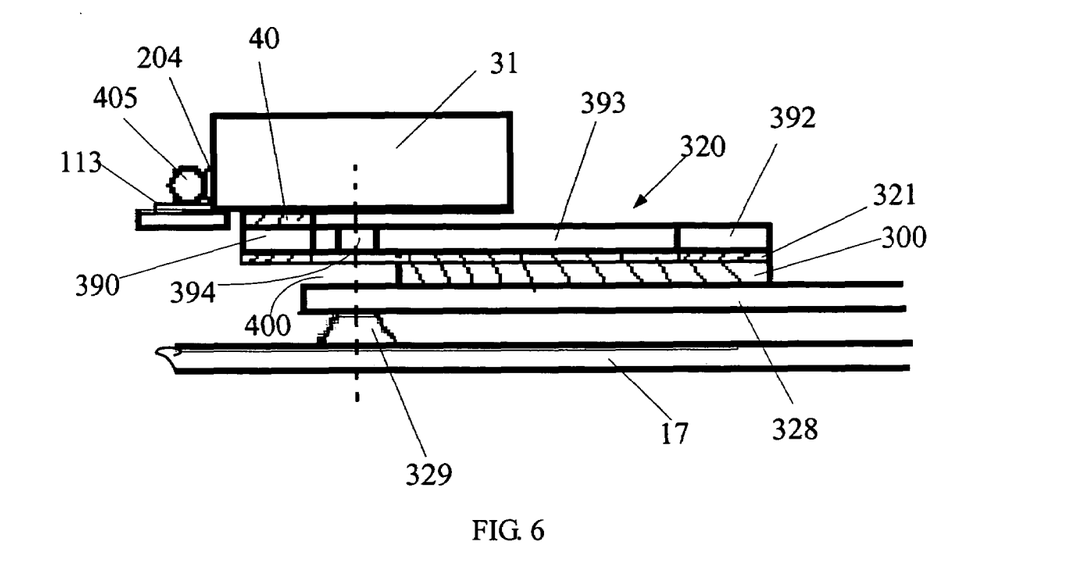
FIG. 6 is a partial, cross-sectional view of the HGA of FIG. 4 taken along line A-A.

Referring to the FIGS. 4-5, according to an embodiment of the invention, the micro-actuator 32 comprises a support frame 320 and two PZT pieces 321, 322. Each of the PZT pieces 321, 322 has a plurality of electrical bonding pads thereon (for example, the PZT piece 321 has two electrical bonding pads 321*a* and the PZT piece 322 has two electrical bonding pads 322*a*) corresponding to the electrical bonding pads 328*a*. The support frame 320 can be made of metal (i.e. stainless steel), ceramic or polymer, which comprises a bottom plate 392, a top plate 390, and a leading beam 393 to connect the bottom plate 392 with the top plate 390 in parallel on a predetermined distance. The bottom plate 392 and the top plate 390 each have a rectangle shape. A pivot part 394 is formed on the leading beam 393, which has a narrower width than that of the leading beam 393. As an embodiment, the bottom plate 392 has two free ends 392*a*, 392*b*, while the top plate 390 has two free ends 390*a*, 390*b*. Referring to FIG. 6, as an embodiment, the pivot part 394 can be formed corresponding to the position of the dimple 329 of the load beam 17, then, the support frame 320 has a same rotation center with the suspension tongue 328 while a parallel gap 400 is formed between the support frame 320 and the suspension tongue 328. In the invention, the PZT piece 321 is connected with the support frame 320 by bonding its two ends with the free ends 392*b* and 390*b* of the support frame 320. Similarly, the PZT piece 322 is bonded with the support frame 320 by bonding its two ends with the free ends 392a and 390a of the support frame 320. The bonding method of the PZT pieces 321, 322 with the support frame 320 can be traditional bonding method, such as epoxy bonding, anisotropic conductive film (ACF) bonding. In the invention, the two PZT pieces 321, 322 are preferably made of thin film PZT material which can be a single-layer PZT element or a multi-layer PZT element. As an embodiment, each of the PZT pieces 321, 322 has a multi-layer structure, which comprises an inner substrate layer and an outer PZT layer. The substrate layer can be made of ceramic, polymer or metal. The out PZT layer can be a single-layer PZT element or a multi-layer PZT element.

With reference to FIGS. 5 and 6, a support bar 300 is formed on suspension tongue 328 to support the support frame 320. In the present invention, the support bar 300 may be integrally formed with the suspension tongue 328, or bonded to the suspension tongue 328 by laser welding. In an embodiment, the support bar 300 has a thickness of 30 μm or more than 30 μm, which is made of polymer or metal (such as stainless steel).

Referring to FIGS. 4-6, in an embodiment of the present invention, the two PZT pieces 321, 322 are bonded with the support frame 320 to form the micro-actuator 32; then, the slider 31 is coupled with the micro-actuator 32; after that, the slider 31 and the micro-actuator 32 are mounted on the suspension 8 to form the HGA 3. In the present invention, the slider 31 is partially mounted on the support frame 32 by epoxy or ACF 40. Preferably, the slider 31 is partially mounted with the top plate 390. The micro-actuator 32 are mounted on the suspension 8 by bonding the two PZT pieces 321, 322 with the suspension tongue 328 using ACF. Accordingly, the electrical bonding pads 321a and 322a of the two PZT pieces 321, 322 are electrically connected with the electrical bonding pads 328a of the suspension tongue 328 so as to electrically connect the micro-actuator 32 with the two electric multi-traces 311 of the suspension 8. At the time, the support bar 300 is under the support frame 320 to support the bottom plate 392 of the support frame 320. As an embodiment, the support bar 300 has an end adjacent to the pivot part 394. In the present invention, a plurality of metal balls 405 (GBB, SBB or conductive adhesive) are used to electrically connect the electrical bonding pads 204 of the slider 31 with the electrical bonding pads 113 so as to electrically connect the slider 31 with the electric multi-traces 309. Through the electric multi-traces 309, 311, the connection pads 308 electrically connect the slider 31 and the micro-actuator 32 with the control system (not shown). Obviously, the assembly of the HGA 3 can also be performed as follows: firstly, coupling the micro-actuator 32 with the suspension 8, and then mounting the slider 31 on the micro-actuator 32.

Figure 7:
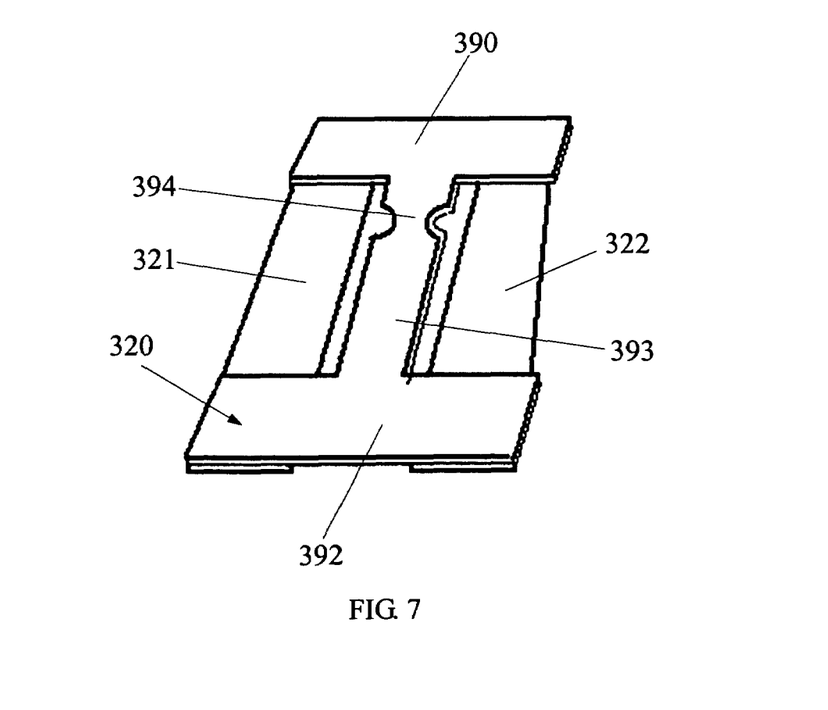
FIG. 7 show an initial status of the micro-actuator when no voltage is applied thereto.
Figure 8:
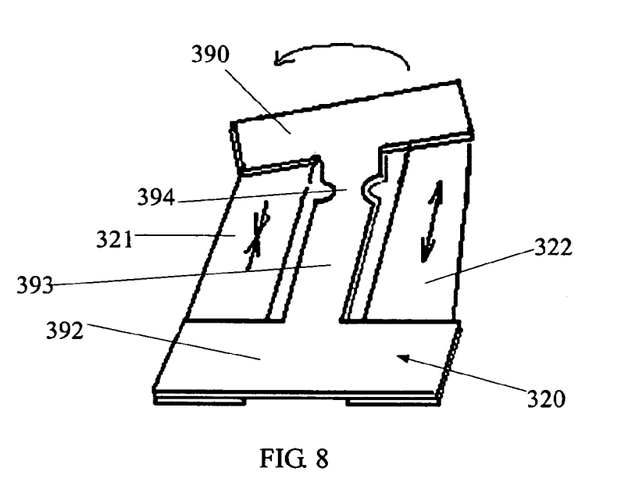
FIGS. 8 and 9 show two different operation methods of the micro-actuator of FIG. 7 when being excited.
Figure 9:
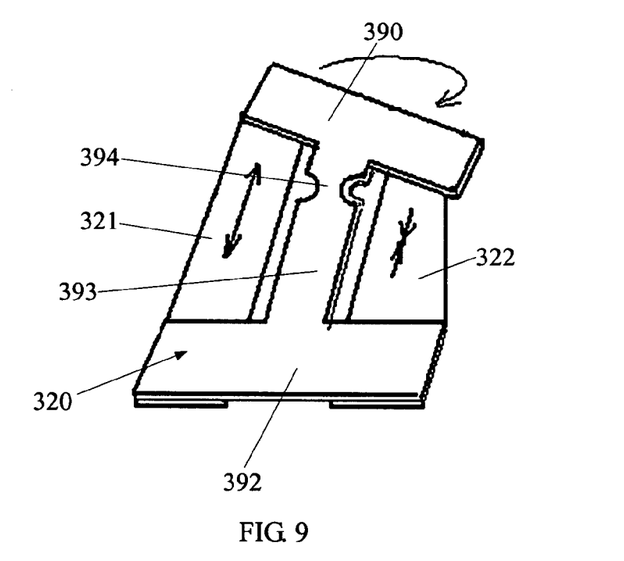
Figure 10A:
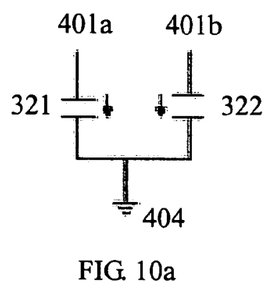
FIG. 10*a* shows an electrical connection relationship of two PZT pieces of the micro-actuator of FIG. 7, which have a same polarization direction according to an embodiment of the present invention.

FIGS. 7-9, 10a, 10c show a first operation method of the micro-actuator 32 for performing a position adjustment function. In the embodiment, the two PZT pieces 321, 322 have a same polarization direction, as shown in FIG. 10a, which are common grounded by one end 404 and the other ends 401a and 401b thereof are applied to two voltages with different phase waveforms 406, 408 (see FIG. 10c). FIG. 7 shows an initial status of the micro-actuator 32 when no voltage is applied to the PZT pieces 321, 322 of the micro-actuator 32. When the two voltages with waveforms 406, 408 are applied to the two PZT pieces 321, 322, in a first half period, with their drive voltages' change, the PZT piece 321 will contract gradually till to a shortest position and the PZT piece 322 will expand gradually till to a longest position (such positions corresponding to a largest displacement position), and then gradually back to its original location. In the present invention, because the PZT piece 321 is bonded with the free ends 392b and 390b of the support frame 320, and the PZT piece 322 is bonded with the free ends 392a and 390a of the support frame 320, in the first half period, with the change of the drive voltages 406, 408, the top plate 390 will be rotated to left side by the PZT pieces 321, 322 with the pivot part 394 as rotation center and then return back to its original position for a pivot part 394 being formed on the leading beam 393. When the drive voltages 406, 408 goes down to a second half period (having an opposed phase with the first half period), the PZT piece 322 will contract gradually till to a shortest position and the PZT piece 321 will expand gradually till to a longest position with the drive voltages' change so as to rotate the top plate 390 to right side, and then gradually back to its original location. In the present invention, because the pivot part 394 has a narrower width than that of the leading beam 393, so it can assist the horizontal swing of the slider 31, that is, the leading beam 393 can be easily bent at the narrow width pivot part 394 so that the slider 31 can get a bigger swing. In addition, because the support bar 300 is used to support the bottom plate 392 of the support frame 320 so that a parallel gap formed between the top plate 390 and the suspension tongue 328, then the top plate 390 will rotate more freely when being driven by the PZT pieces 321, 322.

Figure 10B:
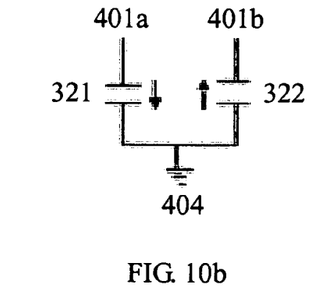
FIG. 10*b* shows an electrical connection relationship of two PZT pieces of the micro-actuator of FIG. 8, which have opposing polarization directions according to another embodiment of the present invention.
Figure 10C:
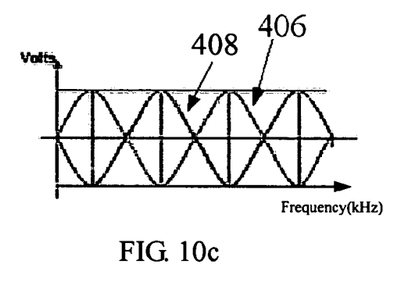
FIG. 10*c* shows two waveforms of voltages which are applied to the two PZT pieces of FIG. 10*a*, respectively.
Figure 10D:
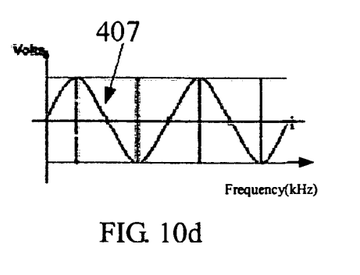
FIG. 10*d* shows a waveform of voltage which is applied to the two PZT pieces of FIG. 10*b*, respectively.

FIGS. 7-9, 10b, 10d show another operation method of the two PZT pieces 321, 322 for performing head position adjustment function. In the embodiment, the two PZT pieces 321, 322 have two opposing polarization directions, as shown in FIG. 10b, which are also common grounded by one end 404 and the other ends 401a and 401b thereof are applied two voltages with a same sine waveform 407 (see FIG. 10d). Under the drive of the voltages, the PZT piece 321 will contract while the PZT piece 322 will expand during a same first half period so as to rotate the top plate 390 of the support frame 320 to left side, and when the voltages go to next half period, the PZT pieces 321 will expand while the PZT piece 322 will contract so as to rotate the top plate 390 to right side.

In the present invention, because the slider 31 is partially mounted on the top plate 390 of the support frame 320, the slider 31 will be rotated with a central portion thereof (corresponding to the pivot part 394) as a rotation center along with the top plate 390 so that a fine head position adjustment can be attained.

Compared with the prior art, the micro-actuator 32 of the invention can rotate the slider 31 with a central portion thereof as a rotation center, thus both trailing side and leading side of the slider 31 can be moved in different directions, while the micro-actuator of the prior art can only move trailing side of the slider like a swing (because its leading side is fixed). So, the present invention can make the slider get a bigger swing than the prior art because both trailing and leading side of the slider can move. Accordingly, a big head position adjustment capacity can be attained.

Figure 11:
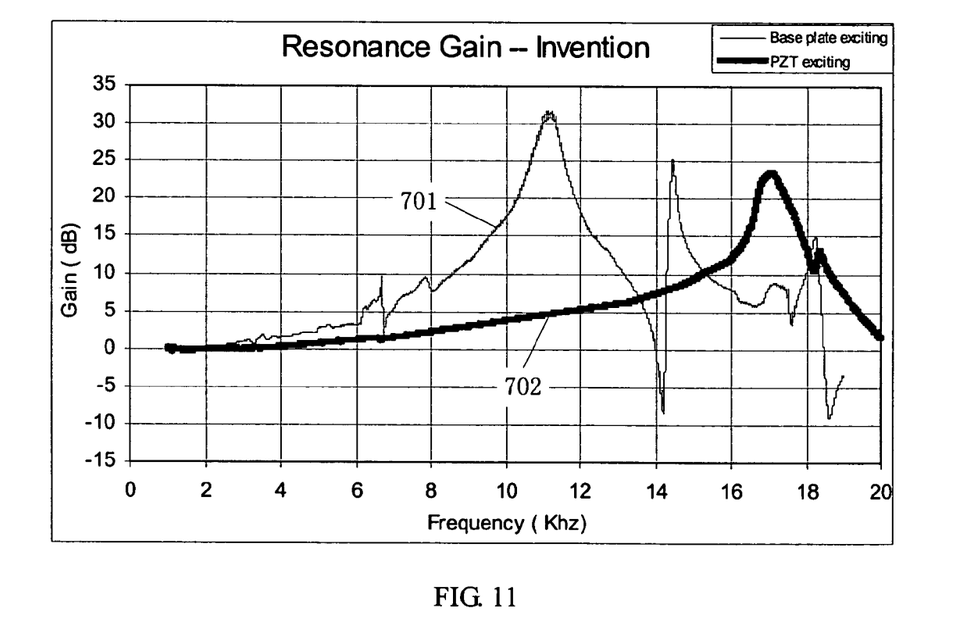
FIG. 11 shows a resonance curve of the HGA of FIG. 3.

FIG. 11 show a testing result of the resonance performance of the HGA of the invention, here, 701 represents a base plate exciting resonance curve, and 702 represents a micro-actuator exciting resonance curve. It shows that a suspension resonance has not happened in a low frequency, but only a pure micro-actuator resonance happened in a high frequency when exciting the micro-actuator 32, this would enlarge the servo bandwidth and improve the capacity of the HDD, reduce the slider seeking and settling time.

Figure 12:
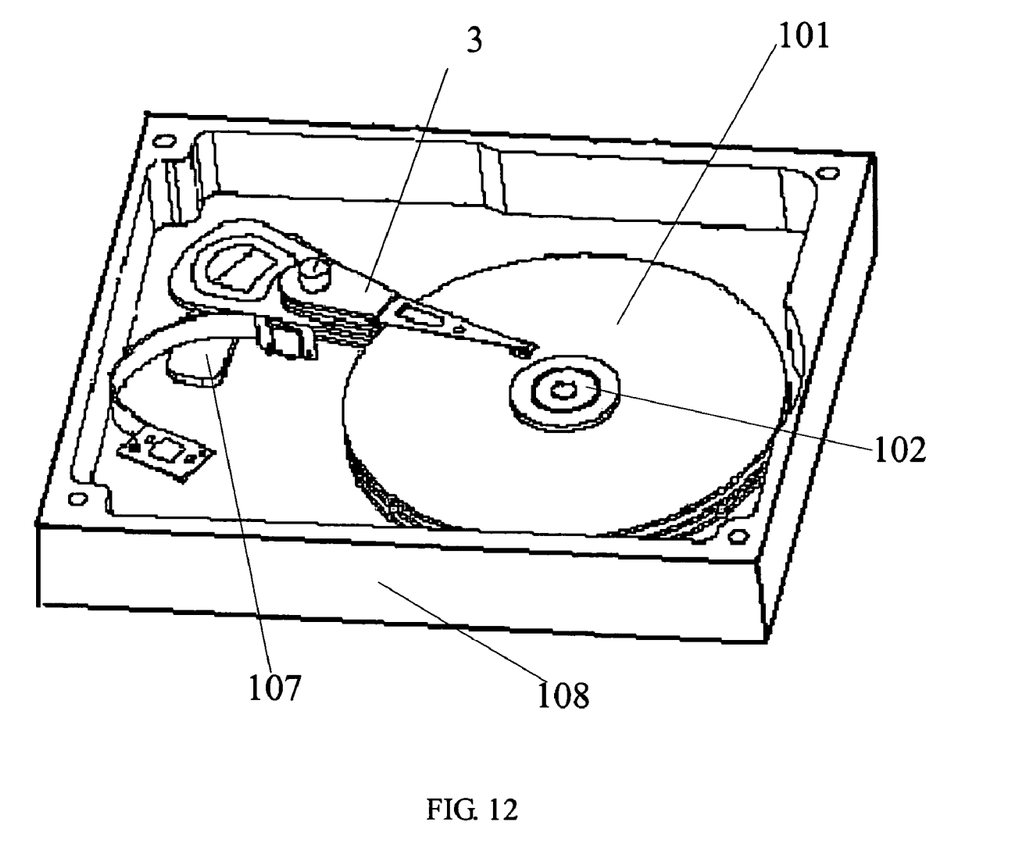
FIG. 12 is perspective view of a disk drive unit according to an embodiment of the invention.

In the present invention, referring to FIG. 12, a disk drive unit of the present invention can be attained by assembling a housing 108, a disk 101, a spindle motor 102, a VCM 107 with the HGA 3 of the present invention. Because the structure and/or assembly process of disk drive unit of the present invention are well known to persons ordinarily skilled in the art, a detailed description of such structure and assembly is omitted herefrom.

What is claimed is:

1. A head gimbal assembly comprising:
   a slider;
   a micro-actuator horizontally rotating the slider with a central portion of the slider as a rotation center; and
   a suspension to load the slider and the micro-actuator;
   wherein the micro-actuator comprises a support frame having a base, a moving plate, and a leading beam to connect the base and the moving plate; and
   at least one piezoelectric pieces to be connected with the base and the moving plate;
   wherein
   the leading beam has a pivot part to assist the horizontal swing of the slide, wherein the base and the moving plate are substantially parallel to one another; and
   the leading beam is substantially perpendicular to the base and the moving plate.

2. The head gimbal assembly as claimed in claim 1, wherein the pivot part has a narrower width than that of the leading beam.

3. The head gimbal assembly as claimed in claim 1, wherein the suspension comprises a support means to support the base of the support frame on a suspension tongue portion.

4. The head gimbal assembly as claimed in claim 3, wherein the at least one piezoelectric pieces is sandwiched between the suspension tongue portion and the support frame of the micro-actuator, and an ACF piece physically and electrically bonds the at least one piezoelectric pieces with the suspension.

5. The head gimbal assembly as claimed in claim 1, wherein the slider is partially mounted on the moving plate of the support frame.

6. The head gimbal assembly as claimed in claim 3, wherein the support means is integrally formed with the suspension or bonded to the suspension.

7. The head gimbal assembly as claimed in claim 3, wherein the support means is made of polymer or metal.

8. The head gimbal assembly as claimed in claim 3, wherein the suspension has a load beam with a dimple to support the suspension tongue portion and the pivot part is formed corresponding to the position of the dimple.

9. The head gimbal assembly as claimed in claim 3, wherein a parallel gap is formed between the support frame and the suspension tongue portion.

10. The head gimbal assembly as claimed in claim 1, wherein the at least one piezoelectric pieces is a thin film piezoelectric pieces or a ceramic piezoelectric pieces.

11. The head gimbal assembly as claimed in claim 1, wherein the at least one piezoelectric pieces has a single-layer structure or a multi-layer structure comprising a substrate layer and a piezoelectric layer.

12. The head gimbal assembly as claimed in claim 11, wherein the piezoelectric layer is a single-layer PZT structure or a multi-layer PZT structure, the substrate layer is made of metal, ceramic, or polymer.

13. A micro-actuator comprising:
    a support frame having a base, a moving plate, and a leading beam to connect the base and the moving plate; and
    at least one piezoelectric pieces to be connected with the base and the moving plate; wherein
    the leading beam has a pivot part to assist the horizontal swing of the moving plate,
    wherein
    the base and the moving plate are substantially parallel to one another; and
    the leading beam is substantially perpendicular to the base and the moving plate.

14. The micro-actuator as claimed in claim 13, wherein the pivot part has a narrower width than that of the leading beam.

15. The micro-actuator as claimed in claim 13, wherein the base and the moving plate are connected in parallel by the leading beam on a predetermined distance, each of which has a rectangle shape.

16. The micro-actuator as claimed in claim 13, wherein each of the at least one piezoelectric pieces has two ends bonded with the base and the moving plate, respectively; and each of the at least one piezoelectric pieces has a plurality of electrical bonding pads formed thereon.

17. The micro-actuator as claimed in claim 13, wherein the at least one piezoelectric pieces is a thin film piezoelectric pieces or a ceramic piezoelectric pieces.

18. The micro-actuator as claimed in claim 13, wherein the at least one piezoelectric pieces has a single-layer structure or a multi-layer structure comprising a substrate layer and a piezoelectric layer.

19. The micro-actuator as claimed in claim 18, wherein the piezoelectric layer is a single-layer PZT structure or a multi-layer PZT structure, the substrate layer is made of metal, ceramic, or polymer.

20. A disk drive unit comprising:
    a head gimbal assembly;
    a drive arm to connect with the head gimbal assembly;
    a disk; and
    a spindle motor to spin the disk; wherein the head gimbal assembly comprising a slider; a micro-actuator horizontally rotating the slider with a central portion of the slider as a rotation center; and a suspension to load the slider and the micro-actuator; wherein
    the micro-actuator comprises a support frame having a base, a moving plate, and a leading beam to connect the base and the moving plate; and
    at least one piezoelectric pieces to be connected with the base and the moving plate; wherein
    the leading beam has a pivot part to assist the horizontal swing of the slider, wherein
    the base and the moving plate are substantially parallel to one another; and
    the leading beam is substantially perpendicular to the base and the moving plate.

* * * * *